United States Patent [19]
Lutz

[11] Patent Number: 6,080,938
[45] Date of Patent: Jun. 27, 2000

[54] METHOD AND APPARATUS FOR RESETTING A PRODUCT SCALE OF A RETAIL CHECKOUT TERMINAL

[75] Inventor: Dusty L. Lutz, Lawrenceville, Ga.

[73] Assignee: NCR Corporation, Dayton, Ohio

[21] Appl. No.: 08/910,702

[22] Filed: Aug. 13, 1997

[51] Int. Cl.[7] .......................... G01G 19/40; G01G 19/56; G06K 15/00; A63F 9/02
[52] U.S. Cl. ...................... 177/25.15; 705/416; 235/383; 186/61; 73/1.13; 702/87; 702/102
[58] Field of Search .................................. 177/25.15, 50, 177/25.11, 25.13; 73/1.13, 1.15; 705/416; 186/61; 235/383; 702/101, 102, 87

[56] References Cited

U.S. PATENT DOCUMENTS

| | | | |
|---|---|---|---|
| 3,962,569 | 6/1976 | Loshbough et al. | 177/25.13 |
| 3,962,570 | 6/1976 | Loshbough et al. | 177/25.13 |
| 3,984,667 | 10/1976 | Loshbough | 177/25.13 |
| 3,986,012 | 10/1976 | Loshbough et al. | 177/25.13 |
| 4,004,139 | 1/1977 | Hall | 177/25.13 |
| 4,392,535 | 7/1983 | Fuji et al. | 177/1 |
| 4,412,298 | 10/1983 | Feinland et al. | 177/25.13 |
| 4,660,160 | 4/1987 | Tajima et al. | 177/2 |
| 4,709,770 | 12/1987 | Kohashi et al. | 177/50 |
| 4,964,053 | 10/1990 | Humble | 364/466 |
| 5,058,691 | 10/1991 | Sela | 177/50 |
| 5,115,888 | 5/1992 | Schneider | 186/61 |
| 5,426,282 | 6/1995 | Humble | 235/383 |
| 5,494,136 | 2/1996 | Humble | 186/61 |
| 5,832,417 | 11/1998 | Petrucelli et al. | 702/101 |
| 5,952,642 | 9/1999 | Lutz | 235/383 |

FOREIGN PATENT DOCUMENTS

| | | |
|---|---|---|
| 0060701 | 9/1982 | European Pat. Off. . |
| 0124355 | 11/1984 | European Pat. Off. . |
| 2285687 | 7/1995 | United Kingdom . |

OTHER PUBLICATIONS

"Analogue–code Converter Used with Strain Gauge Hopper Weighter", Instrumentation and Control, Mar. 3, 1969, A.T. Gamburer et al.

*Primary Examiner*—Randy W. Gibson
*Attorney, Agent, or Firm*—Maginot, Addison & Moore

[57] ABSTRACT

A method of resetting a product scale of a retail checkout terminal includes the step of detecting absence of an item on the product scale. The method also includes the step of generating an absence signal in response to the detecting step. The method further includes the step of determining a first idle value with the product scale. The method also includes the step of comparing the first idle value to a reset value. Moreover, the method includes the step of generating a first control signal if the first idle value matches a reset value. The method also includes the step of generating a second control signal if the first idle value does not match the reset value. Yet further, the method includes the step of resetting the product scale in response to generation of the second control signal. An apparatus for resetting a product scale of a retail checkout terminal is also disclosed.

22 Claims, 5 Drawing Sheets

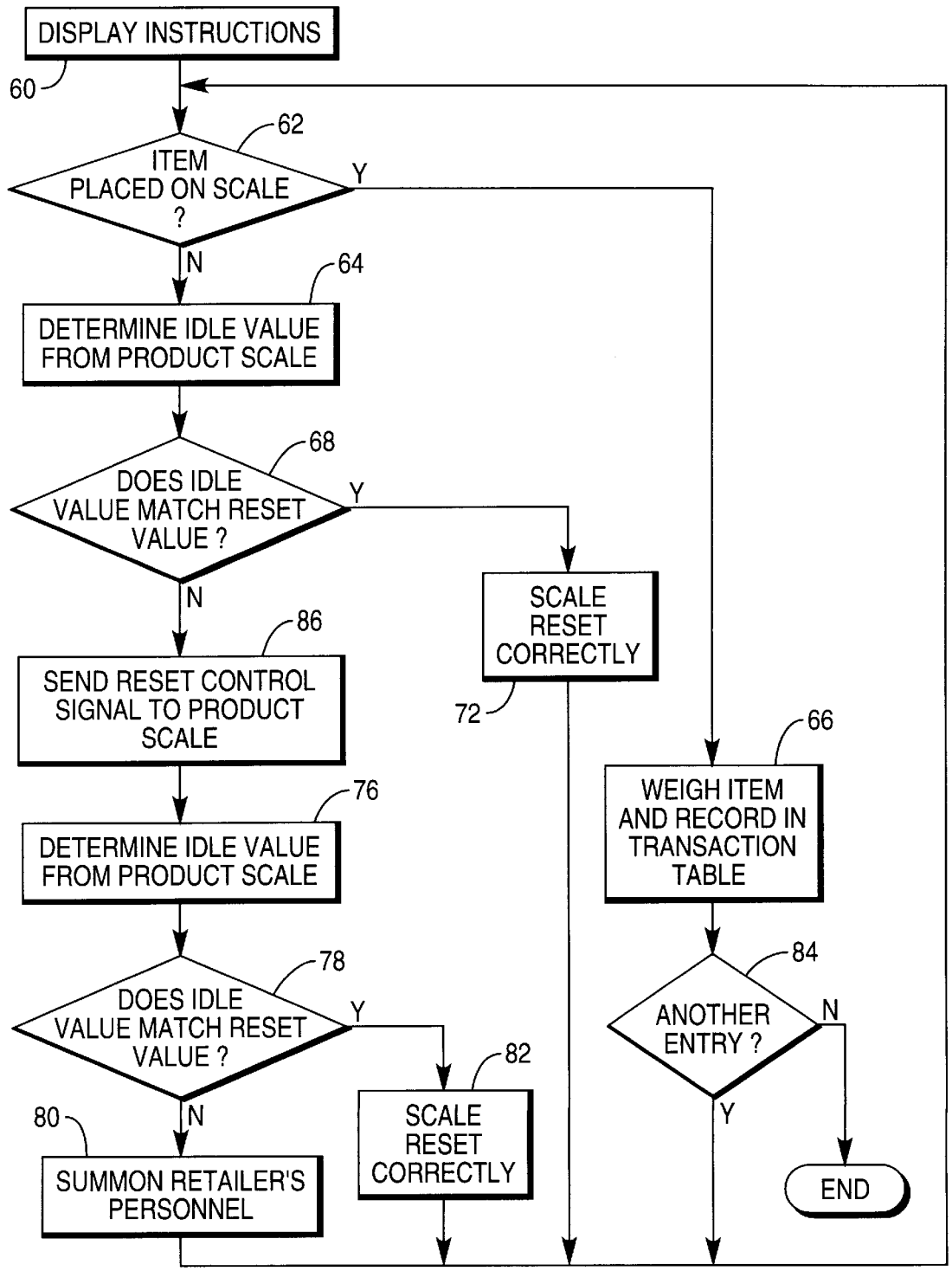

METHOD AND APPARATUS FOR RESETTING A PRODUCT SCALE OF A RETAIL CHECKOUT TERMINAL

TECHNICAL FIELD OF THE INVENTION

The present invention relates generally to a retail checkout terminal, and more particularly to a method and apparatus for resetting a scale of a retail checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process items or goods to be purchased. To this end, a number of self-service checkout terminal concepts have been developed which substantially eliminate the need for a checkout clerk.

One improvement which has had a large impact on reducing the amount of time required to process items through an assisted checkout terminal or a self-service checkout terminal is the use of optical scanning equipment such as scanners or bar code readers. Unfortunately, there are a fair number of items available in a grocery store that do not have a bar code such as a universal product code (UPC) associated therewith. Generally, those items not having a bar code associated therewith are items, such as produce, whose price is based upon the weight of the item. The trend in the supermarket industry has been to determine the weight of a produce item at the checkout terminal during the checkout process by using a product weight scale (typically associated with a slot scanner device).

In order to checkout or otherwise process a produce item, a user (i.e. the customer) of the self-service checkout terminal places the produce item on the product scale and then performs a data entry procedure for the produce item. In particular, the produce item resting on the weight scale is typically identified by entering or otherwise selecting a product look-up (PLU) code via a data input device such as a keypad or touch screen.

Once the produce item has been weighed and properly identified, a processing unit associated with the retail checkout terminal determines a price for the produce item based in part on the weight of the produce item. In particular, the weight of the produce item, as determined by the product scale, is multiplied by a cost code (typically expressed as a price per unit of weight) associated with the PLU code. Such cost codes are stored in or transmitted to a processing unit associated with the self-service checkout terminal during the checkout process.

After completion of a number of measurements, the product scale may need to be reset. In particular, after a number of measurements, the product scale may actually register a positive or negative non-zero weight value despite the fact that an item is not resting on the product scale thereby generating an erroneous reading during a subsequent weight measurement by the user. For example, if the product scale registers a weight of one-tenth of a pound (instead of zero pounds) prior to the time at which the user places two pounds of apples thereon, the product scale may erroneously determine the weight of the apples to be two and one-tenth pounds. Hence, the user of the self-service checkout terminal may be charged for the extra weight (i.e. one-tenth pound), but yet not receive the produce (i.e. the apples) corresponding thereto.

Such erroneous measurements may be due to a number of conditions. For example, the product scale may have accumulated contamination such as dust and debris thereon. Typically, the checkout clerk operating an assisted retail checkout terminal is trained to verify that the product scale is registering a weight of zero pounds (within a predetermined tolerance range) prior to weighing an item therewith. If the product scale is not registering a weight of zero pounds (within the predetermined tolerance range), the checkout clerk will press a "reset" button associated with the product scale thereby attempting to reset the product scale to a value in which the product scale registers a weight of zero pounds (within the predetermined tolerance range). After the checkout clerk presses the reset button, if the product scale still does not register a weight of zero pounds (within the predetermined tolerance range), the checkout clerk may clean or otherwise remove any contamination from the product scale and thereafter press the reset button again. After which, the checkout clerk may take additional corrective measures, such as summoning maintenance personnel, if the product scale still does not register a weight of zero pounds (within the predetermined tolerance range).

However, the user of a self-service checkout terminal (i.e. the customer) may not have any prior training in the operation of the checkout terminal. Therefore, the user may not be aware of the necessity or procedure for resetting the product scale. Hence, the user may operate the product scale in a manner which may generate a number of erroneous weight measurements.

What is needed therefore is an apparatus and method for resetting the product scale of retail checkout terminal. What is further needed is an apparatus and method for resetting the product scale of a self-service checkout terminal which reduces the number of occasions in which the user generates erroneous weight measurements while operating the product scale.

SUMMARY OF THE INVENTION

In accordance with a first embodiment of the present invention, there is provided a method of resetting a product scale of a retail checkout terminal. The method includes the step of detecting absence of an item on the product scale. The method also includes the step of generating an absence signal in response to the detecting step. The method further includes the step of determining a first idle value with the product scale. The method also includes the step of comparing the first idle value to a reset value.

In accordance with a second embodiment of the present invention, there is provided a method of resetting a product scale of a retail checkout terminal. The method includes the step of detecting absence of an item on the product scale. The method also includes the step of generating an absence signal in response to the detecting step. The method further includes the step of determining a first idle value with the product scale. The method also includes the step of comparing the first idle value to a reset value. Moreover, the method includes the step of generating a first control signal if the first idle value matches a reset value. The method also includes the step of generating a second control signal if the first idle value does not match the reset value. Yet further, the method includes the step of resetting the product scale in response to generation of the second control signal.

In accordance with a third embodiment of the present invention, there is provided an apparatus for resetting a product scale of a retail checkout terminal. The apparatus includes a mechanism for detecting absence of an item on the product scale and generating an absence signal in response thereto. The apparatus also includes a mechanism for determining a first idle value with the product scale in response to generation of the absence signal. The apparatus further includes a mechanism for comparing the first idle value to a reset value. Moreover, the apparatus includes a mechanism for generating a first control signal if the first idle value matches the reset value.

It is therefore an object of the present invention to provide a new and useful method of resetting a product scale of a retail checkout terminal.

It is a further object of the present invention to provide an improved method of resetting a product scale of a retail checkout terminal.

It is yet another object of the present invention to provide a new and useful apparatus for resetting a product scale of a retail checkout terminal.

It is moreover an object of the present invention to provide an improved apparatus for resetting a product scale of a retail checkout terminal.

It is also an object of the present invention to provide an apparatus and method for resetting the product scale of a self-service checkout terminal which reduces the number of occasions in which the user generates erroneous weight measurements while operating the product scale.

It is yet another object of the present invention to provide a method and apparatus for assisting or otherwise supervising a user in the use and operation of a self-service checkout terminal.

The above and other objects, features, and advantages of the present invention will become apparent from the following description and the attached drawings.

BRIEF DESCRIPTION OF THE DRAWINGS

FIG. 5 is a flowchart setting forth in detail a second embodiment of the portion of the itemization step of the general procedure of FIG. 3.

DETAILED DESCRIPTION OF THE INVENTION

Figure 1:
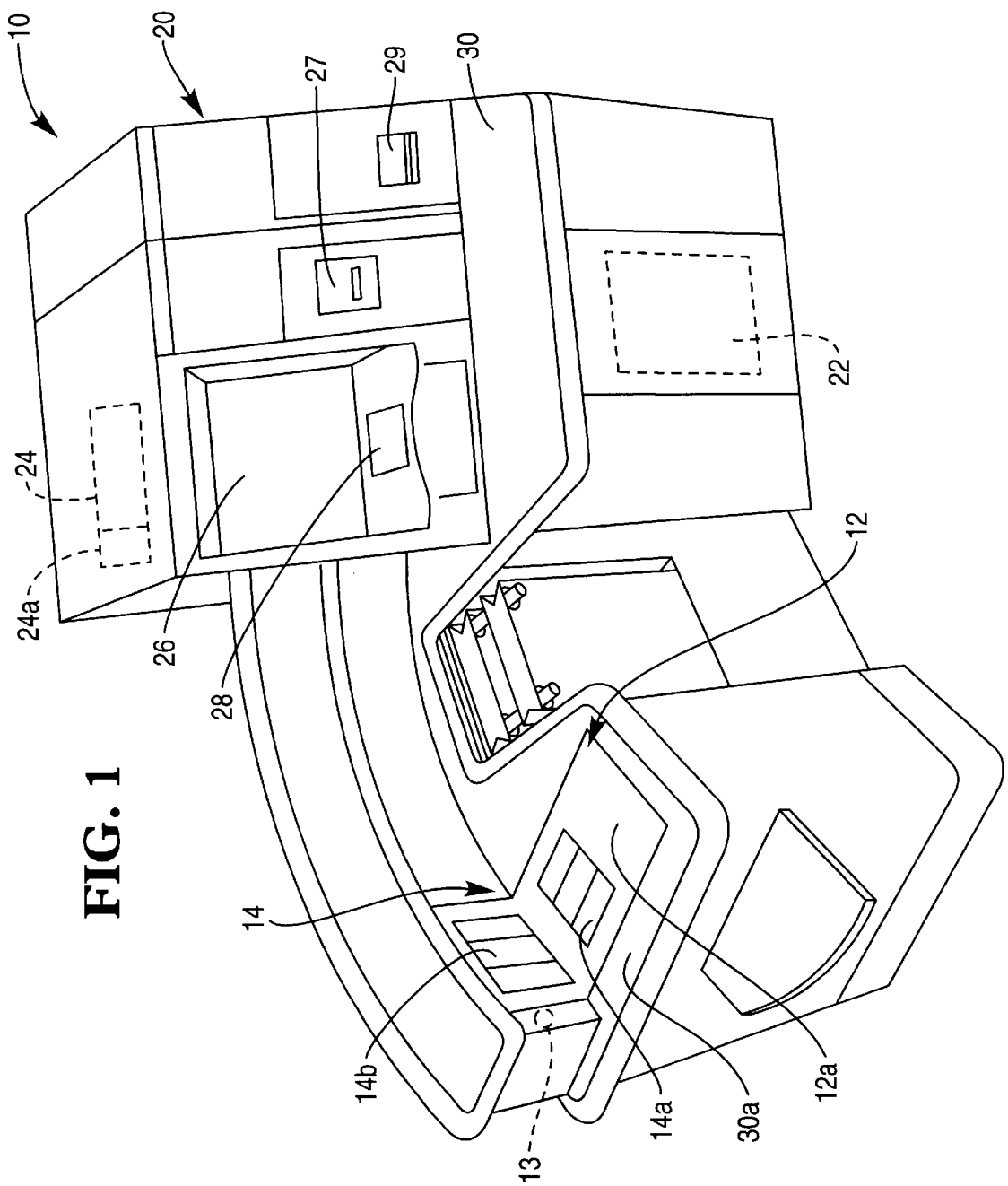
FIG. 1 is a perspective view of a self-service checkout terminal which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a retail or self-service checkout terminal 10 for use in a retail business such as a grocery store. The self-service checkout terminal 10 includes a product scale 12, a scanner 14, a processing unit 22, a detection or video system 24, a display monitor 26, and a data input device 28. The video system 24, the display monitor 26, and the data input device 28 may be integrated in order to lower costs associated with the self-service checkout terminal 10. In particular, the video system 24, the display monitor 26, and the data input device 28 may be components of an automated teller machine (ATM) 20 which is included in the self-service checkout terminal 10.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed flush-mounted relative to an upper surface 30a of a counter 30. The second scanning window 14b is disposed in substantially perpendicular fashion to the upper surface 30a of the counter 30.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The product scale 12 is integrated with the scanner 14. More specifically, an upper surface 12a of the product scale 12 is flush-mounted relative the upper surface 30a of the counter 30 and envelops the scanning window 14a of the scanner 14. If an item such as produce is placed upon the upper surface 12a of the product scale 12 or the scanning window 14a, the product scale 12 may be used to determine the weight of the item. Moreover, the product scale 12 includes a reset button 13. When a user pushes the reset button 13, the scale is reset thereby causing the scale to register a reset value. What is meant herein by the term "reset value" is a value that the product scale 12 should register when no object or item is placed on the upper surface 12a thereof. More specifically, the reset value is indicative of (1) a weight of zero pounds, or (2) a weight within a predetermined tolerance range of zero pounds. It should be appreciated that the product scale 12 may also include circuitry (not shown) for enabling the product scale 12 to be reset electronically via the processing system 22. In particular, the processing unit 22 may generate a reset control signal which is sent to the product scale 12 thereby causing the product scale 12 to register the reset value without the need for the user to push the reset button 13.

The video system 24 includes a video camera 24a, as shown in FIG. 1. The video camera 24a is positioned in a location in which the video system 24 detects the presence of objects within a number of "target areas". What is meant herein by use of the term "target area" of the video system 24 is an area in which the video system 24 is capable of detecting the presence of a number of objects. For example, a product scale target area is defined by the maximum range in which an item can be placed in order to have the weight thereof measured with the product scale 12. It should therefore be appreciated that the presence of an item within the product target area is indicative of an item being placed on the upper surface 12a of the product scale 12 or the scanning window 14a of the scanner 14.

The display monitor 26 displays instructions which serve to guide a user through a checkout procedure. For example, an instruction is displayed on the display monitor 26 which instructs the user to remove an item from a grocery cart or trolley (not shown) and (1) pass the item over the scanner 14, or (2) place the item on the product scale 12 in order to obtain the weight of the item. The display monitor 26 may be a known touch screen monitor which can generate data signals when certain areas of the screen are touched by a user.

Figure 2:
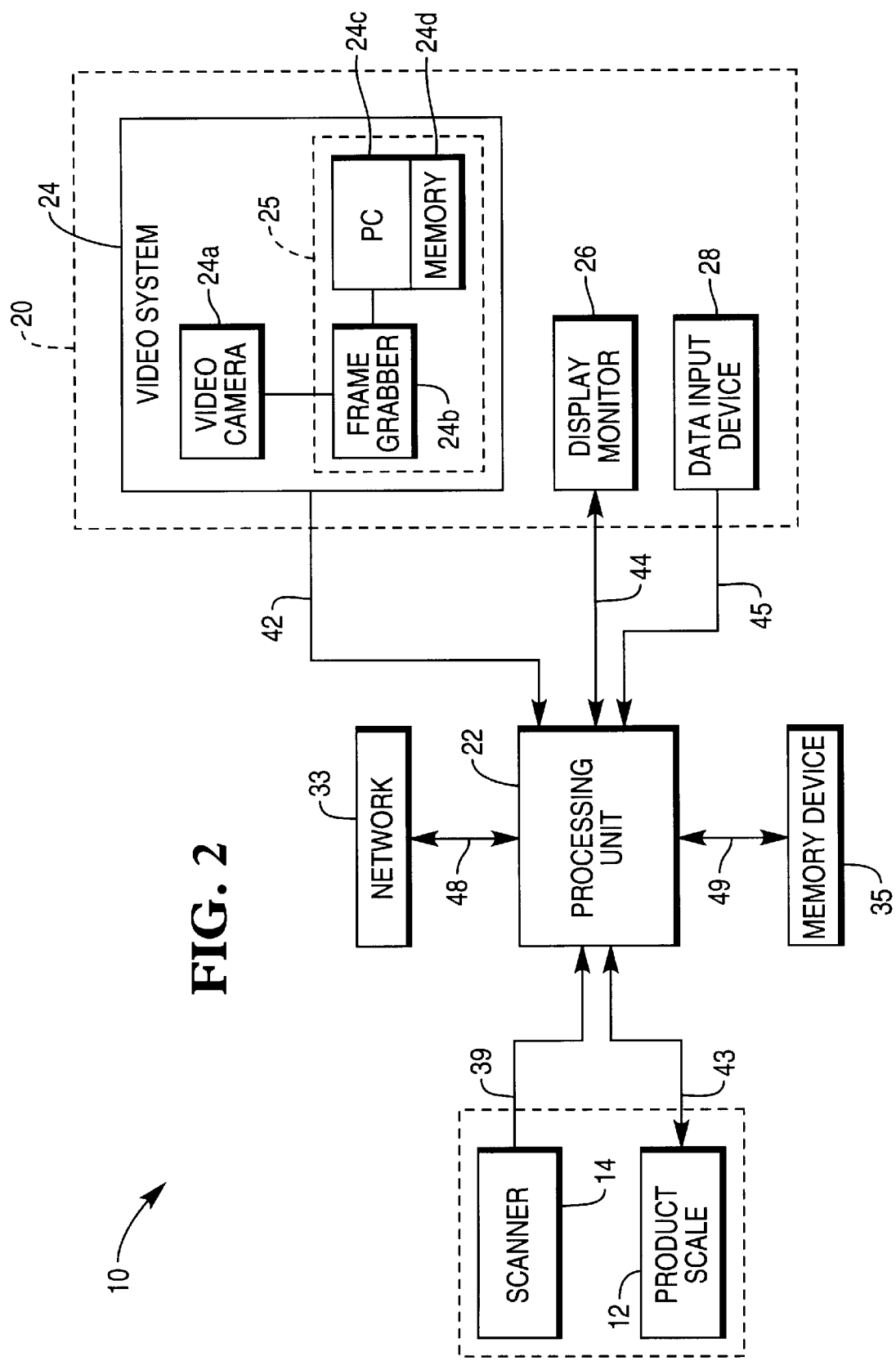
FIG. 2 is a simplified block diagram of the self-service checkout terminal of FIG. 1.

Referring now to FIG. 2, there is shown a simplified block diagram of the self-service checkout terminal 10. The processing unit 22 is electrically coupled to the product scale 12, the scanner 14, the video system 24, the display monitor 26, and the data input device 28. The processing unit 22 is also electrically coupled to a network 33 and a memory device 35 as shown in FIG. 2.

The processing unit 22 monitors output signals generated by the scanner 14 via a communication line 39. In particular, when the user of the self-service checkout terminal 10 scans an item which includes a bar code across the scanning windows 14a, 14b, an output signal is generated on the communication line 39. Thereafter, the processing unit 22 processes the output signal in order to make a record of the item which was scanned for purposes of generating a bill and a receipt at the end of the transaction.

The processing unit 22 communicates with the video system 24 via a communication line 42. In addition to the video camera 24a, the video system 24 includes a frame grabber 24b, and a processing system 24c such as a personal computer (PC). The processing system 24c and the frame grabber 24b are collectively referred to as a video processor 25. The video processor 25 receives a standard video signal format, such as RS-170, NTSC, CCIR, or PAL, from the video camera 24a.

Video output signals from the video camera 24a are input to the frame grabber 24b. The frame grabber 24b operates to convert the analog video signals from the video camera 24a into a digital image which is stored within a memory 24d for subsequent processing by the video processor 25. Once representations of the digital images from the video camera 24a are stored in memory 24d, the video processor 25 may begin to analyze or otherwise process the video image in order to determine presence or absence of an item on the upper surface 12a of the product scale 12 or the scanning window 14a of the scanner 14. In particular, the digital images from the video camera 24a may be compared to stored digital images of the product scale 12 (without items thereon) in order to determine the absence or presence of an item on the product scale 12. One video system 24 which is suitable for use in the present invention is disclosed in U.S. Provisional patent application entitled "Motion Pattern Recognition for a Self Checkout System" (NCR Docket No. 7408) which was filed on Feb. 7, 1997, by Ralph Crabtree, which is incorporated herein by reference, and which is assigned to the same assignee as the present invention.

The processing unit 22 communicates with the product scale 12 via a data communication line 43. The product scale 12 generates output signals on the data communication line 43 indicative of the magnitude of the weight of an item positioned on the product scale 12. In addition, the processing unit 22 generates output signals which are transmitted to the product scale 12 via the data communication line 43. For example, the processing unit 12 may generate the reset control signal which causes the product scale 12 to register the reset value.

The processing unit 22 communicates with the display monitor 26 through a data communication line 44. The processing unit 22 generates output signals on the data communication line 44 which cause various instructional messages to be displayed on the display monitor 26. The display monitor 26 may include known touch screen technology which can generate output signals when the user touches a particular area of the display screen associated with the display monitor 26. The signals generated by the display monitor 26 are transmitted to the processing unit 22 via the data communication line 44. It should be appreciated that the various instructional messages may also be communicated via other devices in addition to or in lieu of the display monitor 26. For example, the instructional messages may be generated with a voice generating device (not shown) or an audible tone generating device (not shown).

The data input device 28 is coupled to the processing unit 22 through a data communication line 45. The data input device 28 may include one or more of a known keypad or a touch pad.

The processing unit 22 includes network interface circuitry (not shown) which conventionally permits the self-service checkout terminal 10 to communicate with the network 33 such as a LAN or WAN through a wired connection 48. The processing unit 22 communicates with the network 33 during the checkout procedure in order to communicate with a paging system (not shown) or the like which pages or otherwise summons the retailer's personnel as described further below. In addition, the processing unit 22 communicates with the network 33 to obtain information, such as pricing information, associated with an item being scanned or weighed, and also to verify customer credit approval when appropriate. The network interface circuitry associated with the self-service checkout terminal 10 may include a known Ethernet expansion card, and the wired connection 48 may include a known twisted-pair communication line. Alternatively, the network interface circuitry may support wireless communications with the network 33.

The processing unit 22 communicates with the memory device 35 via a data communication line 49. The memory device 35 is provided to maintain an electronic transaction table which includes a record of the product information associated with each item that is scanned, weighed, or otherwise entered during the user's operation of the self-service checkout terminal 10. For example, if the user scans a can of soup, the description of the soup and the pricing information associated therewith is recorded in the transaction table in the memory device 35. Similarly, if the user weighs a watermelon with the product scale 12 and then enters a product identification code associated with watermelon via the data input device 28, the product information associated with the watermelon would be recorded in the transaction table. Moreover, if a user entered a coupon or voucher, the information associated therewith would also be recorded in the transaction table.

It should therefore be appreciated that the sum of each of the items recorded in the transaction table minus any reductions (e.g. coupons) is the amount that the user pays for his or her transaction. Moreover, data stored in the transaction table is printed out on a printer 29 (see FIG. 1) thereby generating a receipt for the user at the end of his or her transaction.

Figure 3:
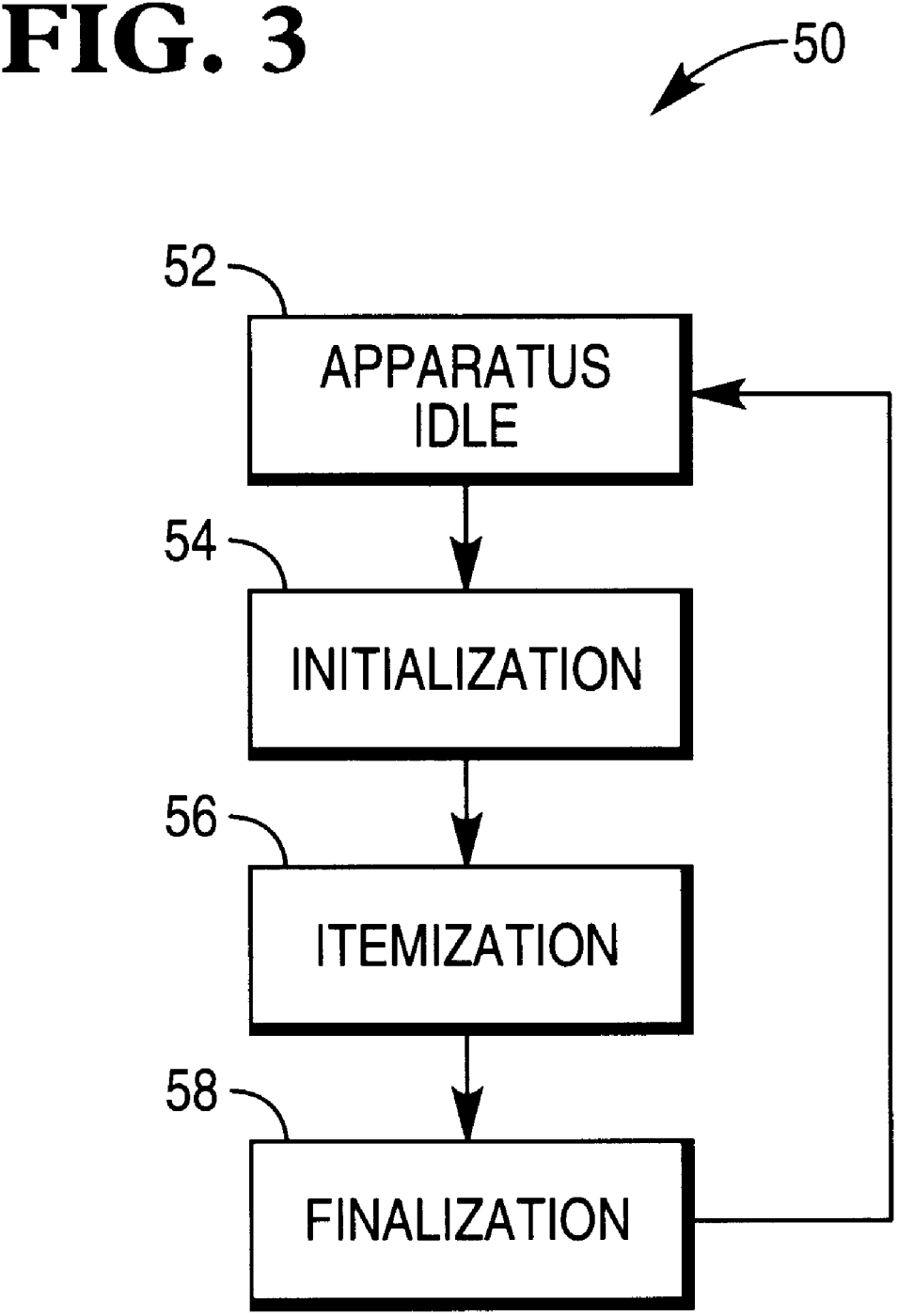
FIG. 3 is a flowchart setting forth a general procedure for checking out items through the self-service checkout terminal of FIG. 1.

Referring now to FIG. 3, there is shown a flowchart which sets forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 26 which instruct the user to (1) touch a particular area of the display monitor 26 or push a particular button on the data input device 28 in order to select a desired method of payment, and/or (2) identify himself or herself by inserting a shopping card, debit card, credit card, or smart card into a card reader 27 (see FIG. 1).

At the completion of the initialization step 54, the routine 50 advances to an itemization step 56 where the user scans the individual items for purchase across the scanner 14. Moreover, in step 56 the user weighs produce items with the product scale 12, and thereafter enters the product code associated with the produce item via either the data input device 28 or by touching a particular area of the display monitor 26. At the completion of the itemization step, the routine 50 advances to a finalization step 58 in which (1) a grocery receipt is printed by the printer 29, and (2) payment is tendered by either inserting currency into a cash acceptor (not shown), charging a credit card or debit card account, or decreasing a value amount stored on a smart card via the card reader 27. It should be appreciated that in the case of when a user inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent user initiates a checkout procedure.

Figure 4:
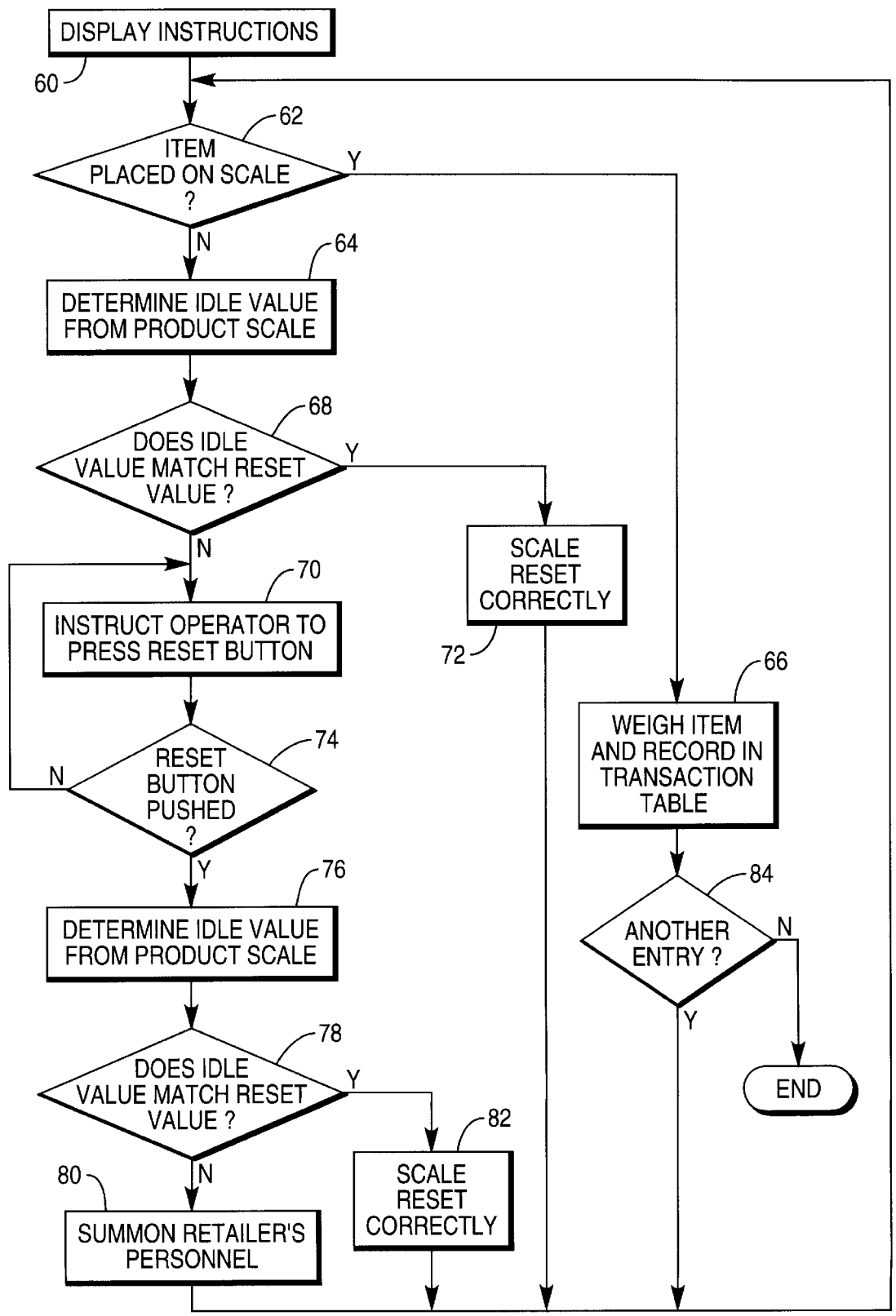
FIG. 4 is a flowchart setting forth in detail a first embodiment of a portion of the itemization step of the general procedure of FIG. 3.

Referring now to FIG. 4, there is shown a flowchart setting forth the itemization step 56 in greater detail. After the initialization step 54 (see FIG. 3) is completed, the routine 56 advances to step 60 where a message is displayed on the display monitor 26 which instructs the user to either (1) pass or otherwise scan individual items across or adjacent the scanner 14 with the product identification code facing the scanning windows 14a, 14b, or (2) place an individual item on the product scale 12 in order to be weighed.

The routine 56 then advances to step 62 where the processing unit 22 scans or reads the data communication line 42 to determine whether the video system 24 has detected the user placing an item on the product scale 12. In particular, the video system 24 generates an output signal which is sent to the processing unit 22 once the video system 24 detects the presence of an item on the product scale 12. If an item is not detected on the product scale 12, the processing unit 22 generates an absence signal and thereafter, the routine 56 advances to step 64. If an item is detected on the product scale 12, the routine 56 advances to step 66.

In step 64, the processing unit 22 determines an idle value that is being registered by the product scale 12. In particular, the processing unit 22 scans or reads the data communication line 43 to determine the magnitude of the idle value registered by the product scale 12. What is meant herein by the term "idle value" is the value registered by the product scale 12 when no items are positioned thereon. After determining the idle value of the product scale 12, the routine 56 then advances to step 68.

In step 68, the processing unit 22 determines if the idle value of the product scale 12 (as determined in step 64) matches the reset value of the product scale 12. What is meant herein by the term "matches" is that the magnitude of the idle value is within a predetermined tolerance range of the reset value. More specifically, the idle value matches the reset value if (1) the idle value has a magnitude of zero pounds, or (2) the idle value has a magnitude within the predetermined tolerance range of zero pounds. For example, if the product scale 12 has been previously reset or is not in need of being reset, the idle value matches the reset value (i.e. the magnitude of the idle value is within the predetermined tolerance range of the reset value). However, if the product scale 12 is in need of being reset (e.g. the upper surface 12a of the product scale 12 has contamination thereon), the idle value does not match the reset value (i.e. the magnitude of the idle value is not within the predetermined tolerance range of the reset value). If the idle value of the product scale 12 (as determined in step 64) does not match the reset value, the routine 56 advances to step 70. If the idle value of the product scale 12 (as determined in step 64) matches the reset value, the routine 56 advances to step 72.

In step 70, the processing unit 22 causes a message to be displayed on the display monitor 26 which instructs the user to press the reset button 13 (see FIG. 1). The routine 56 then advances to step 74.

In step 74, the processing unit 22 monitors the communication line 43 from the product scale 12 in order to determine whether the user pressed the reset button 13. If the user presses the reset button 13, the routine 56 advances to step 76. If the user does not press the reset button 13 within a predetermined period of time, the routine 56 loops back to step 70.

Step 76 follows the same general procedure outlined above in regard to step 64. In particular, the processing unit 22 determines the idle value registered by the product scale 12. In particular, the processing unit 22 scans or reads the data communication line 43 to determine the magnitude of the idle value registered by the product scale 12. After determining the idle value of the product scale 12, the routine 56 then advances to step 78.

Step 78 follows the same general procedure outlined above in regard to step 68. In particular, the processing unit 22 determines if the idle value of the product scale 12 (as determined in step 76) matches the reset value of the product scale 12. If the idle value of the product scale 12 (as determined in step 76) does not match the reset value, the routine 56 advances to step 80. If the idle value of the product scale 12 (as determined in step 76) matches the reset value, the routine 56 advances to step 82.

In step 80, the processing unit 22 causes an output signal to be sent to the network 33 which in turn pages or otherwise summons the retailer's personnel or attendants in order to assist the user. In particular, the processing unit 22 generates an output signal on the wired connection 48 which causes the retailer's personnel, such as maintenance personnel, to be paged thereby notifying the retailer's personnel that the product scale 12 needs servicing. The routine 56 then advances back to step 62.

Returning now to step 78, if the idle value of the product scale 12 (as determined in step 76) matches the reset value, the routine 56 advances to step 82. In step 82, the processing unit 22 determines that the product scale 12 has been correctly reset. In particular, since the processing unit 22 determined that the idle value matched the reset value in step 78, the processing unit 22 concludes that the product scale 12 has been correctly reset, and thereafter the processing unit 22 generates an affirmative control signal which is indicative of the successful match. The routine 56 then advances back to step 62.

Returning now to step 68, if the idle value of the product scale 12 (as determined in step 64) matches the reset value, the routine 56 advances to step 72. In step 72, the processing unit 22 determines that the product scale 12 has been correctly reset. In particular, since the processing unit 22 determined that the idle value matched the reset value in step 68, the processing unit 22 concludes that the product scale 12 has been correctly reset, and thereafter the processing unit 22 generates an affirmative control signal which is indicative of the successful match. The routine 56 then advances back to step 62.

Returning now to step 62, if an item is detected on the product scale 12 by the video system 24, the routine 56 advances to step 66. In step 66, the processing unit scans or reads the data communication line 43 to determine the magnitude of the weight of the item which was placed on the product scale 12. Thereafter, the processing unit 22 enters a record corresponding to the item in the transaction table. More specifically, the processing unit 22 communicates with the network 33 to obtain the product information (e.g. description and price) of the weighed item. After which, the processing unit 22 updates the transaction table. More specifically, the processing unit 22 generates an output signal which is sent to the memory device 35 which causes the transaction table to be updated in the memory device 35 to include the product information associated with the weighed item. The routine 56 then advances to step 84.

In step 84 the processing unit 22 monitors the communication line 45 from the data input device 28 and the communication line 44 from the display monitor 26 to determine whether the user has more items to be entered. In particular, a message is displayed on the display monitor 26 instructing the user to touch a particular touch screen area displayed on the display monitor 26, or to touch a particular key associated with the data input device 28, when the user has completed entering all of the items for purchase.

If a particular signal is detected on either of the communication lines 44 or 45, the processing unit 22 determines that the checkout procedure is complete and the routine 56 then ends thereby advancing the routine 50 to the finalization step 58 (see FIG. 3). If a particular signal is not detected on the either the communication lines 44 or 45, the routine 56 advances to step 62.

Referring now to FIG. 5, there is shown a flowchart of a second embodiment of the itemization step 56. The second embodiment of the itemization step 56 will hereinafter be designated with reference numeral 56'. Moreover, the same reference numerals are used in FIG. 5 to designate common steps which were previously discussed in regard to FIG. 4. Therefore, no further discussion thereof is warranted.

The itemization step 56' is essentially the same as the itemization step 56, except that the steps related to the user's use of the reset button 13 (i.e. steps 70 and 74) have been replaced with step 86. In particular, the processing unit 22 does not instruct the user to press the reset button 13 (step 70) and thereafter verify the customer's completion of the instruction (step 74), but rather the processing unit 22 automatically generates a reset control signal which is sent to the product scale 12. More specifically, in step 86, the processing unit 22 concludes that the product scale 12 needs to be reset since the idle value did not match the reset value in step 68. Therefore, the processing unit 22 automatically generates a reset control signal which is transmitted to the product scale 12 via the data communication line 43 thereby causing the product scale 12 to be reset in the manner described above. Hence, the user is not required to press the reset button 13. After the reset control signal has been sent to the product scale 12, the routine 56' advances to step 76 and continues in the manner previously discussed.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, although the invention has been described as being used for resetting the product scale 12 of the self-service checkout terminal 10, it should be appreciated that the present invention may be used to reset product scales associated with other types of retail checkout terminals. For example, the present invention may be used to reset the product scale of an assisted retail checkout terminal (i.e. a retail checkout terminal which is operated by an employee of the retail business such as a checkout clerk).

Although the detection system is described herein as the video system 24 and has significant benefits in its use in the present invention, other types of detection systems may be used to achieve many of the advantages of the present invention. For example, the detection system may include spectrometers or infrared detectors.

What is claimed is:

1. A method of operating a retail checkout terminal, comprising the steps of:

providing a scanner for scanning a first item of a user's items for purchase;

providing a product scale for weighing a second item of the user's items for purchase;

detecting absence of the second item on the product scale and generating an absence signal in response thereto;

determining a first idle value with the product scale in response to generation of the absence signal; and comparing the first idle value to a reset value after the detecting step and generating a first control signal if the first idle value matches the reset value.

2. The method of claim 1, further comprising the step of generating a second control signal if the first idle value does not match the reset value.

3. The method of claim 2, further comprising the step of automatically resetting the product scale in response to generation of the second control signal.

4. The method of claim 3, further comprising the steps of:

determining a second idle value with the product scale in response to the resetting step; and comparing the second idle value to the reset value and generating the first control signal if the second idle value matches the reset value.

5. The method of claim 4, further comprising the step of regenerating the second control signal if the second idle value does not match the reset value.

6. The method of claim 5, further comprising the step of generating a message which instructs an attendant to service the product scale in response to regeneration of the second control signal.

7. The method of claim 2, further comprising the step of generating a message which instructs the user to push a scale reset button in response to generation of the second control signal.

8. The method of claim 1, wherein the detecting step includes the step of detecting absence of the item with a video system.

9. A method of operating a retail checkout terminal, comprising the steps of:

proveiding a scanner for scanning a first item of a user's items for purchase;

providing a product scale for weighing a second item of the user's items for purchase, wherein (i) the product scale includes an upper surface, and (ii) the product scale is configured to determine weight of the second item when the second item is positioned in direct contact with the upper surface;

detecting absence of the second item on the upper surface of the product scale and generating an absence signal in response thereto;

determining a first idle value with the product scale in response to generation of the absence signal;

comparing the first idle value to a reset value after the detecting step;

generating a first control signal if the first idle value matches a reset value;

generating a second control signal if the first idle value does not match the reset value; and automatically resetting the product scale in response to generation of the second control signal.

10. The method of claim 9, further comprising the steps of:

determining a second idle value with the product scale in response to the resetting step;

generating the first control signal if the second idle value matches the reset value; and regenerating the second control signal if the second idle value does not match the reset value.

11. The method of claim 10, further comprising the step of generating a message which instructs an attendant to service the product scale in response to regeneration of the second control signal.

12. The method of claim 9, wherein the detecting step includes the step of detecting absence of the item with a video system.

13. A retail checkout terminal, comprising:

a scanner for scanning a first item of a user's items for purchase;

a product scale for weighing a second item of said user's items for purchase;

means for detecting absence of said second item on said product scale and generating an absence signal in response thereto;

means for determining a first idle value with said product scale in response to said absence signal;

means for comparing said first idle value to a reset value after said absence signal is generated; and means for generating a first control signal if said first idle value matches said reset value.

14. The retail checkout terminal of claim 13, further comprising means for generating a second control signal if said first idle value does not match said reset value.

15. The retail checkout terminal of claim 14, further comprising means for automatically resetting said product scale in response to generation of said second control signal.

16. The retail checkout terminal of claim 15, further comprising:

means for determining a second idle value with said product scale;

means for comparing said second idle value to said reset value; and means for generating said first control signal if said second idle value matches said reset value.

17. The retail checkout terminal of claim 16, further comprising means for regenerating said second control signal if said second idle value does not match said reset value.

18. The retail checkout terminal of claim 17, further comprising means for generating a message which instructs an attendant to service said product scale in response to regeneration of said second control signal.

19. The retail checkout terminal of claim 14, further comprising means for generating a message which instructs the user to push a scale reset button in response to generation of said second control signal.

20. The retail checkout terminal of claim 13, wherein said detecting means includes a video system.

21. The method of claim 1, wherein:

the product scale includes an upper surface, and the product scale is configured to determine weight of the second item when the second item is positioned in direct contact with the upper surface.

22. The retail checkout terminal of claim 13, wherein:

said product scale includes an upper surface, and said product scale is configured to determine weight of said second item when said second item is positioned in direct contact with said upper surface.

* * * * *